United States Patent
Gogolla et al.

(10) Patent No.: US 6,903,810 B2
(45) Date of Patent: Jun. 7, 2005

(54) OPTICAL LATERAL DISTANCE HAND-HELD MEASURING DEVICE

(75) Inventors: Torsten Gogolla, Schellenberg (LI); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 241 days.

(21) Appl. No.: 10/404,996

(22) Filed: Apr. 1, 2003

(65) Prior Publication Data

US 2003/0218736 A1 Nov. 27, 2003

(30) Foreign Application Priority Data

Apr. 2, 2002 (DE) .......................................... 102 14 742

(51) Int. Cl.⁷ ............................. G01C 3/00; G01S 13/08
(52) U.S. Cl. ......................... 356/3; 356/3.01; 342/118; 342/126
(58) Field of Search .......................... 356/3, 3.01, 138; 342/118, 126; 367/99, 118

(56) References Cited

U.S. PATENT DOCUMENTS

| | | | | |
|---|---|---|---|---|
| 5,713,135 A | * | 2/1998 | Acopulos | 33/451 |
| 5,815,251 A | * | 9/1998 | Ehbets et al. | 356/5.01 |
| 6,396,571 B2 | * | 5/2002 | Ohtomo et al. | 356/5.1 |

* cited by examiner

*Primary Examiner*—Gregory J. Toatley, Jr.
*Assistant Examiner*—Roy M. Punnoose
(74) *Attorney, Agent, or Firm*—Sidley Austin Brown & Wood, LLP

(57) ABSTRACT

A lateral distance hand-held measuring device having a computer unit (2), an input/output unit (3) and a first laser distance measuring module (4*a*, 4*b*) transmitting a visible measurement laser beam (I, II). A second laser distance measuring module (4*a*, 4*b*) is provided, which transmits a second visible measurement laser beam (I, II) and is mechanically and data-technically coupled with the first laser distance measuring module (4*a*, 4*b*). The two measurement laser beams (I, II) have a defined pivot angle ($\alpha$) relative to each other and known to the computer unit (2).

12 Claims, 3 Drawing Sheets

US 6,903,810 B2

OPTICAL LATERAL DISTANCE HAND-HELD MEASURING DEVICE

BACKGROUND OF THE INVENTION

The invention relates to an optical hand-held measuring device for the approximate determination of the lateral distance of two light back-scattering measurement points and the inside angle between the position of the hand-held measuring device and the two light back-scattering measurement points.

DE 3109752 and DE 19604018 each disclose a portable, stand-supported measurement device for precise lateral distance measuring featuring a laser distance measuring module combined with an angle measurement system, an input/output unit and a computer unit, which uses the sequentially measured paths to two light back-scattering measurement points and the pivot angle for computing a precise lateral distance. A stand-supported sequential measuring system is cumbersome for specific applications in the construction trades, wherein a precise lateral distance measurement is not necessary.

DE 19836812 discloses a hand-held measuring device for lateral distance measuring featuring a laser distance measuring module, an input/output unit and a computer unit, which uses the paths to two light back-scattering measurement points measured sequentially by the pivoting of the user's hand and the measured perpendicular lateral for calculating an approximation of the lateral distance. The drawbacks are the limitation caused by the required determination of the lateral perpendicular of the measurement objects on planar surfaces, the high measurement errors caused by the determination of the lateral perpendicular, and the high expenditure in finding the lateral perpendicular.

SUMMARY OF THE INVENTION

The object of the invention is to provide a lateral distance hand-held measuring device for any visible light back-scattering measurement point. A further object is to provide a support-free determination of an inside angle between the position of the lateral distance hand-held measuring device and two visible light back-scattering measurement points.

The object is achieved, in accordance with the invention, by an optical lateral distance hand-held measuring device having a computer unit, an input/output unit and a first laser distance measuring module transmitting a visible measurement laser beam having a second laser distance measuring module, which transmits a second visible laser beam and is coupled with the first laser distance measuring module by a connection element, which is preferably configured as a pivoting hinge articulation, mechanical and data-technical and, wherein a pivot angle is known to the computer.

The two aforesaid visible light back-scattering measurement points are produced on the surface of the measurement object using the visible measurement laser beams of the first and second laser distance measuring modules and thus the respective positions marked.

The lateral distance and the internal angle between the position of the hand-held measuring device and the two light back-scattering measurement points can be calculated in the computer unit using trigonometric functions using the second laser distance measuring module and based on the two distances from each of the laser distance measuring modules, measured manually quasi-simultaneously by the operator to a visible light back-scattering measurement point, and to the pivot angle, determined by the operator by the quasi-simultaneous sighting using the two light back-scattering measurement points. For such calculation, it is unnecessary that the two visible light back-scattering measurement points be situated on a planar surface but rather, open space or even an obstacle can exist between the two.

Further advantages are the measurement of distances, whose start and/or end point(s) is (are) inaccessible; the measurement of distances, that are in space up to their start and end point (e.g. space diagonals); and the measurement of lateral distances from a distance without additional successive determination of auxiliary distances.

Yet further advantages are the marking of two characterized light back-scattering measurement points on the surface of a measurement object starting from a third position; the measurement of inside angles under which the two marked light back-scattering measurement points appear from a third position; and the elimination of an expensive and difficult to handle support stand.

The hinge articulation advantageously features a means for detecting the pivot angle, such as an angle measuring telescope, whereby direct measuring of the pivot angle is possible.

Advantageously the means for detecting the pivot angle is configured as an angle encoder, whereby the pivot angle is digitally available for further processing by the computer unit.

Advantageously the pivot range of the hinge articulation includes the pivot angle of 180°, which is preferably configured as a mechanical stop for the hinge articulation, whereby in the 180° position two partial distances can be measured quasi-simultaneously in opposite directions; for example, measuring the height of a room without touching the floor in the process.

The light back-scattering measurement points have a parallax-dependent separation, which can be computed using geometry-dependent device constants, since the rear extended measurement laser beams of the two laser distance measuring modules do not necessarily cut into the pivot axis. Such geometry-dependent device constants are preferably stored in the computer unit enabling the computation of the parallax-dependent separation in the para-axial arrangement of the transmitting optics of at least one laser distance measuring module, relative to the pivot axis of the hinge articulation. An exact measurement of the inside angle formed between the position of the hand-held measurement device and the two light back-scattering measurement points is possible in a para-axial arrangement of one optic an exact lateral distance measurement.

Advantageously, in the lateral distance hand-held measuring device, the first laser distance measuring module is directly connected with the hinge articulation. A mechanical and optional data interface to a second laser distance measuring module is arranged on a measurable oriented limb of the hinge articulation. The laser distance measuring module is configured as a stand-alone device for the purpose of distance measuring and is a fully operational laser distance measuring device. The lateral distance hand-held measuring device can be assembled, if necessary, by the operator on site from the laser distance measuring module with the hinge articulation and an associated laser distance measuring device.

Alternatively, the lateral distance hand-held measuring device features a hinge articulation with mechanical and optional data interfaces arranged on each limb for each laser distance measuring module configured as a stand-alone, fully functional laser distance measuring device.

Alternatively, in the lateral distance hand-held measuring device, mechanical and optional data interfaces to each one of the laser distance measuring modules are arranged on each limb of the hinge articulation, which are configured as stand-alone distance measuring, fully functional laser distance measuring devices. The lateral distance hand-held measuring device can be assembled by the operator, if required, on site from the hinge articulation and two associated laser distance measuring devices.

Preferably, the data interface is configured using electrical plug contacts or using a wireless interface, for example having magnetic, electromagnetic or infrared carrier fields.

Advantageously, mechanical and optional data interfaces to a laser distance measuring module are arranged on each limb in the hinge articulation for use in the lateral distance hand-held measuring device, which are configured as standalone distance measuring, fully functional laser distance measuring devices, whereby the hinge articulation represents a function-enhancing accessory part for laser distance measuring devices.

BRIEF DESCRIPTION OF THE INVENTION

The exemplary embodiment of the invention will be more completely described with reference to the drawings, wherein.

DETAILED DESCRIPTION OF THE INVENTION

Figure 1:
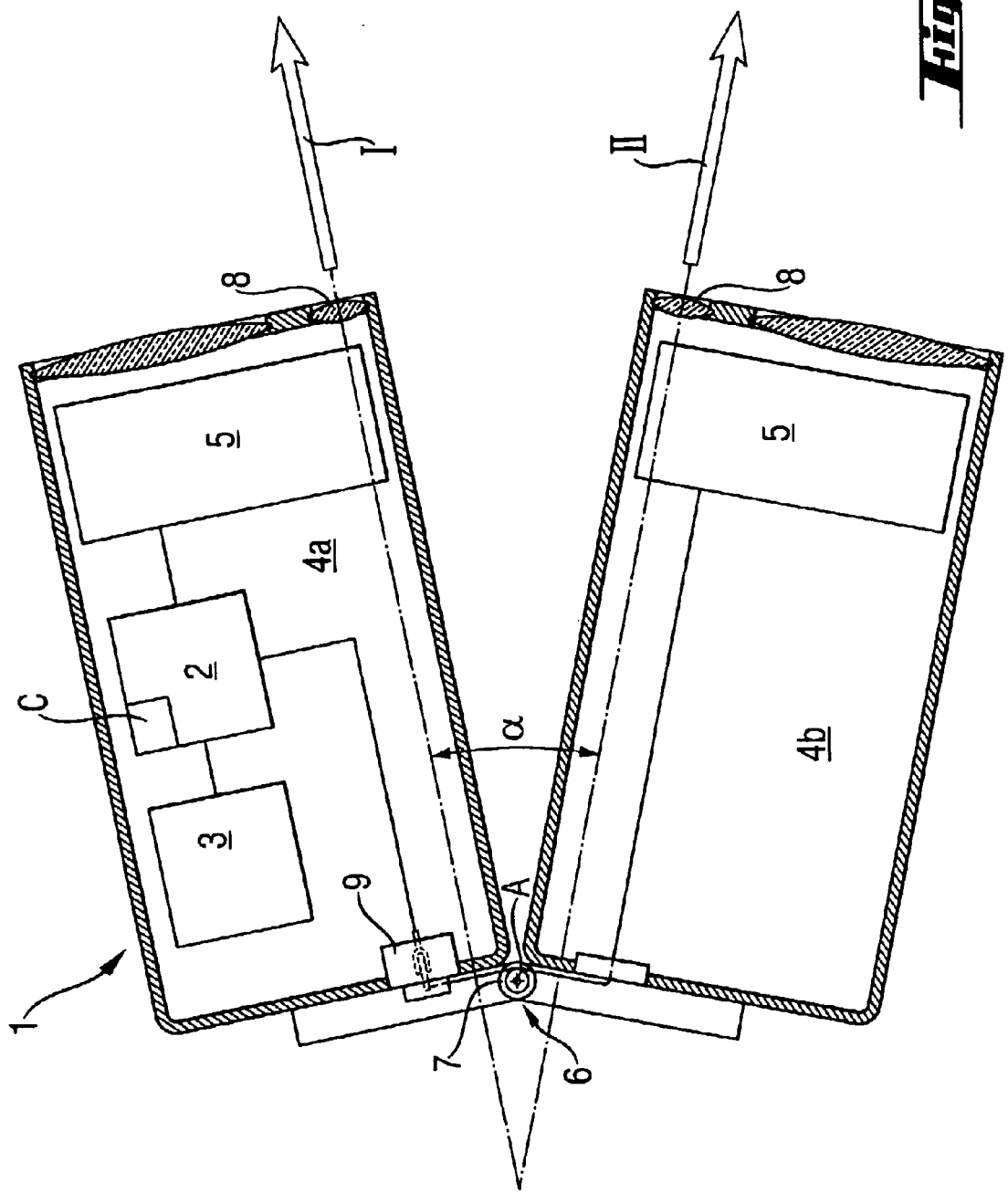
FIG. 1 shows a lateral distance hand-held measuring device, in accordance with the invention.

FIG. 1 shows a lateral distance hand-held measuring device 1 having a computer unit 2 and an input/output unit 3 featuring a laser distance measuring module 4a configured as a laser distance measuring device, which emits a visible measurement laser beam I, with an electro-optical distance measuring system 5. The lateral distance measuring device 4a is coupled by a pivotable hinge articulation 6, mechanically and data-technologically, with a second laser distance measuring module 4b, which sends out a visible measurement laser beam II, with an electro-optical distance measuring system 5, wherein the angle of rotation α between the two measurement laser beams I, II is measured directly using an angle measuring telescope arranged in the hinge articulation 6. The para-axial arrangement of both transmitting optics 8 of the laser distance measuring modules 4a, 4b causes the rear elongated measurement laser beams I, II of the two laser distance measuring modules 4a, 4b not to cut into the axis of pivot A of the hinge articulation 6. The geometry-dependent device constants C associated with this arrangement are stored in the computer unit 2 of the laser distance measurement module 4a. The lateral distance hand-held measuring device 1 features a laser distance measurement module 4b with a hinge articulation 6, on whose measurable oriented limb a mechanical and data interface, designed using electrical wiring and plug contacts, is arranged to a laser distance measuring module 4a. The laser distance measuring module 4a is configured as a stand-alone unit for the purpose of distance measuring and is a fully operational laser distance measuring device.

Figure 2:
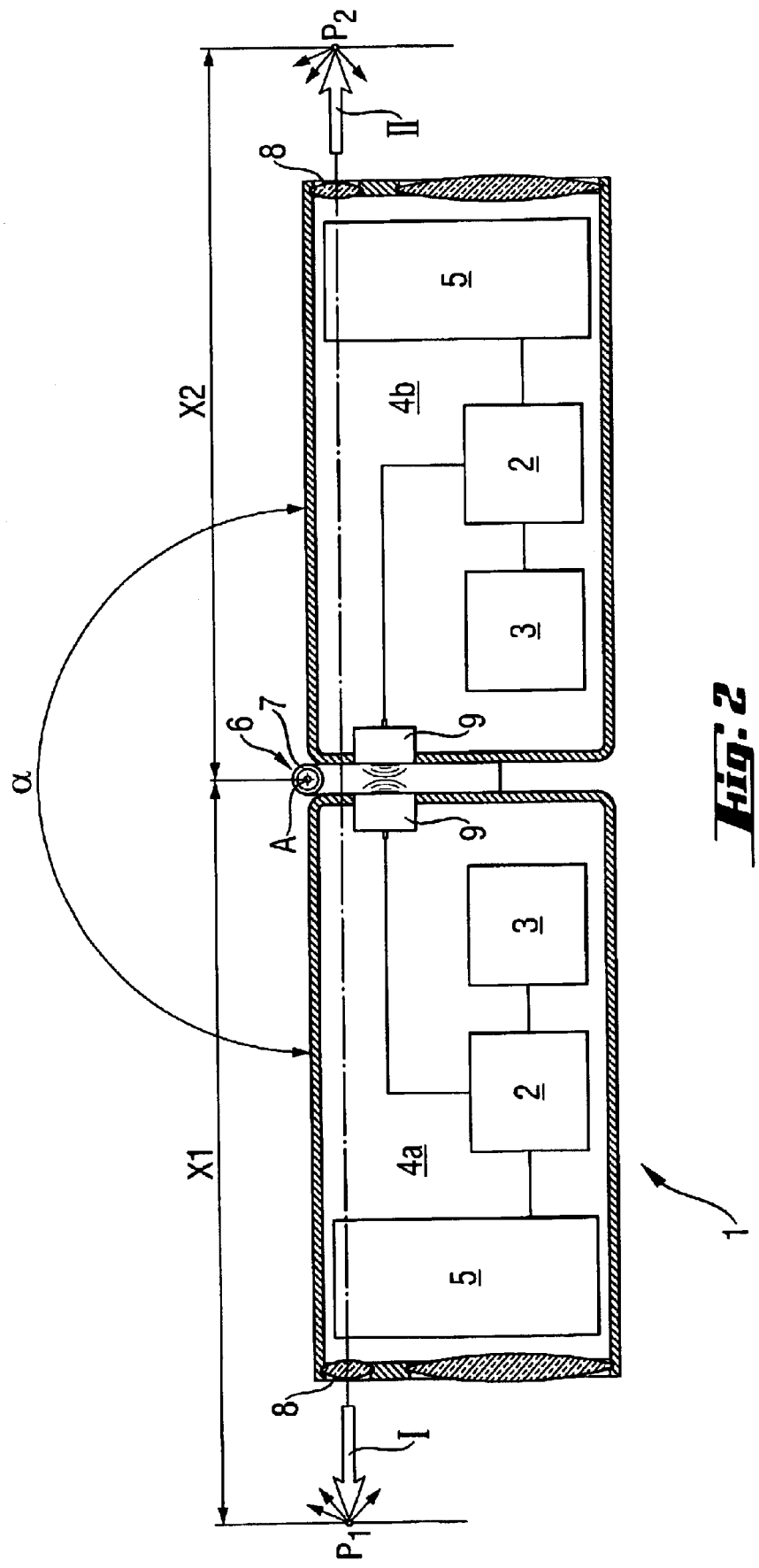
FIG. 2 shows a useful variant of the device shown in FIG. 1.

FIG. 2 shows a lateral distance hand-held measuring device 1 featuring a hinge articulation 6, arranged on each limb, with an angle measuring telescope 7, an interface to a laser distance measuring module 4a, 4b each configured as a freestanding distance measuring, fully functional laser distance measuring device, each with a computer unit 2, an input/output unit 3 and a distance measuring system 5. The interfaces 9 of the laser distance measuring modules 4a, 4b are data-technically electromagnetically connected to each other. The two partial distances X1, X2 to the back-scattered measurement points $P_1$ and $P_2$ are quasi-simultaneously measurable, in a 180° position of the pivot angle α with the two laser distance measuring modules 4a, 4b directed in opposite directions and being formed as a mechanical stop for the hinge articulation 6.

Figure 3:
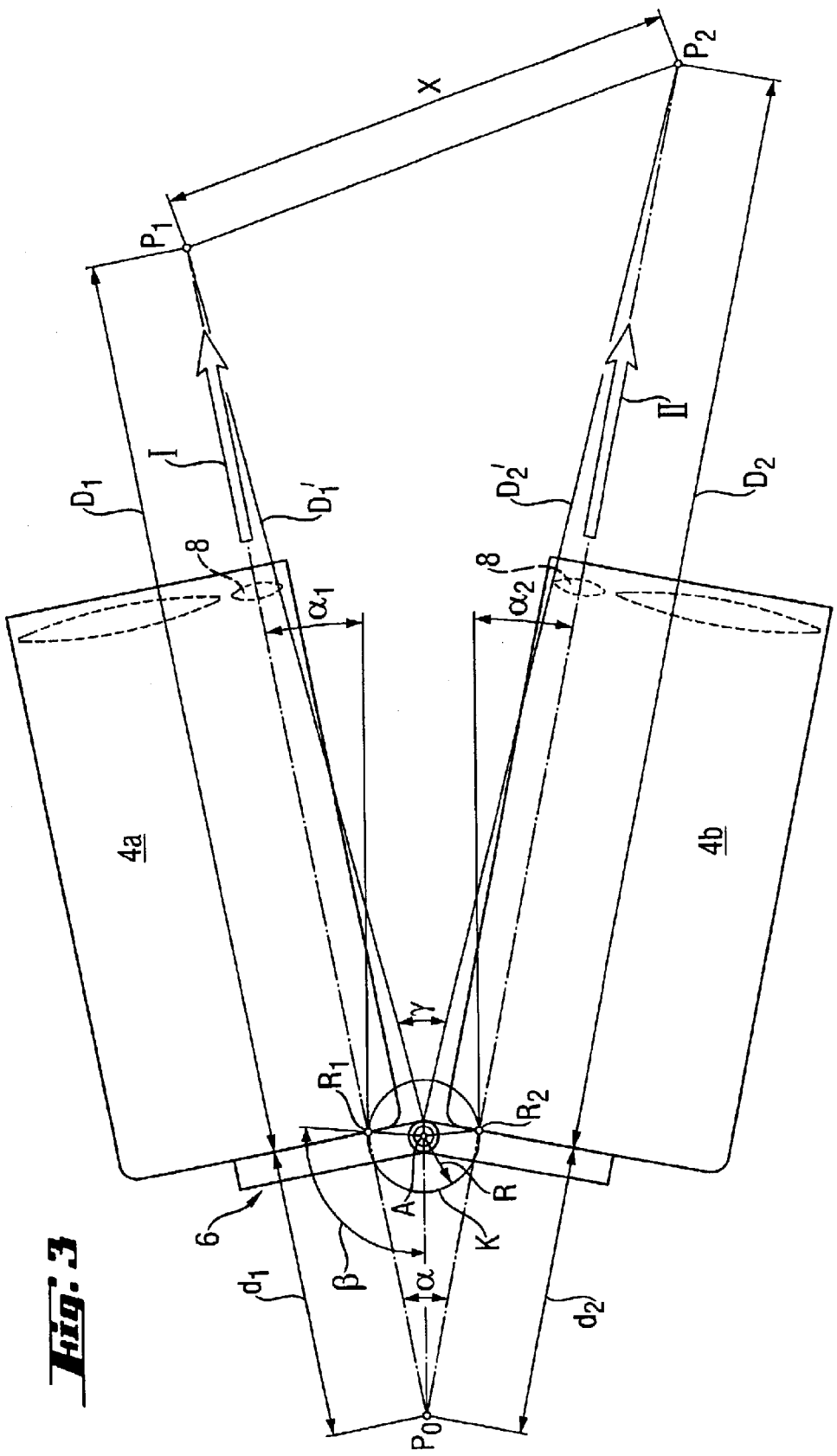
FIG. 3 shows a math model of a lateral distance hand-held measuring device, in accordance with the invention.

FIG. 3 shows a mathematical model of the arrangement, wherein the measured values are drawn in. With the laser distance measurement modules 4a, 4b, the distances $D_1$ and $D_2$ are measured from the reference points $R_1$ and $R_2$ to the light back-scattered measurement points $P_1$ and $P_2$. The measurement laser beams I, II each produce a light back-scattering measurement point $P_1$ and $P_2$ on the surface of the measurement object that do not run parallel and do not cut back into the pivot axis A. The measured pivot angle $\alpha = \alpha_1 + \alpha_2$ are each associated, in half, to the two rotational angles $\alpha_1$ and $\alpha_2$ of the laser distance measuring modules 4a, 4b. Upon rotation, the reference points $R_1$ and $R_2$ run over the periphery of a circle, which is designated as the turning circle K. The central point of the turning circle K is the pivot axis A. The paths $d_1$ and $d_2$, which are given by the geometric arrangement, must first be determined for the unknown lateral distance X to be calculated from the rotation angles $\alpha_1$ and $\alpha_2$ and the distances $D_1$ and $D_2$. The reference points $R_1$ and $R_2$ of the laser distance measuring modules 4a and 4b are offset on the turning circle K. The paths $d_1$ and $d_2$ can be calculated, using the device constants R and β and the rotation angles $\alpha_1$ and $\alpha_2$, according to the equation:

$$d_1 = d_2 = R \cdot \frac{\sin(\beta) + \sin(\alpha_1 + \alpha_2 + \beta)}{\sin(\alpha_1 + \alpha_2)} \tag{1}$$

Herein R is the radius of the turning circle K and β is the angle, under which the reference points $R_1$ and $R_2$ appear from the pivot axis A, in the basic setting ($\alpha_1 = 0°$, $\alpha_2 = 0°$). Using the triangle $P_0 P_1 P_2$ resulting therefrom, the unknown lateral distance X can be indirectly determined according to the equation:

$$X = \sqrt{(d_1 + D_2)^2 + (d_2 + D_2)^2 - 2(d_1 + D_2)(d_1 + D_2) \cdot \cos(\alpha_1 + \alpha_2)} \tag{2}$$

This expression approximates for the special case parallel measurement laser beams I, II ($\alpha_1 = 0°$ and $\alpha_2 = 0°$) versus $$X = \sqrt{(D_1 - D_2) + 4 \cdot R^2 \sin(\beta)} \text{ with } \alpha_1 = 0 \text{ and } \alpha_2 = 0 \tag{3}$$

The inside angle γ and the distances $D_1$ and $D_2$ relative to the pivot axis A can be determined using the measured distances $D_1$ and $D_2$ and the device constants R and β with $$D_1 = \sqrt{R^2 + D_{12} + 2 \cdot D_1 \cdot R \cos(\beta)}, \tag{4}$$

$$D_2 = \sqrt{R^2 + D_{22} + 2 \cdot D_2 \cdot R \cos(\beta)} \tag{5}$$

and $$\gamma = \arccos\left[\frac{X^2 - D_1'^2 - D_2'^2}{2 \cdot D_1' \cdot D_2'}\right] \quad (6)$$

What is claimed is:

1. A lateral distance hand-held measuring device with a computer unit (2), an input/output unit (3) and a first laser distance measuring module (4a, 4b) transmitting a visible measurement laser beam (I, II), wherein a second laser distance measuring module (4a, 4b) is provided, which transmits a second visible measurement laser beam (I, II) and is mechanically coupled, via a connecting element, and data-technically coupled with the first laser distance measuring module (4a, 4b) and, wherein the first and the second measurement laser beams (I, II) have a defined pivot angle ($\alpha$) relative to each other, said angle being known to the computer unit (2).

2. The lateral distance hand-held measuring device of claim 1, wherein the connecting element is configured as a pivotable hinge articulation (6) and the pivot angle ($\alpha$) can be determined by the computer unit (2).

3. The lateral distance hand-held measuring device of claim 2, wherein the hinge articulation (6) includes a means for determining the pivot angle ($\alpha$).

4. The lateral distance hand-held measuring device of claim 3, wherein the means for determining the pivot angle ($\alpha$) of the hinge articulation (6) is an angle measuring telescope (7).

5. The lateral distance hand-held measuring device of claim 4, wherein the pivot range of the hinge articulation (6) includes the pivot angle ($\alpha$) of 180°.

6. The lateral distance hand-held measuring device of claim 5, wherein geometry-dependent device constants (C) are stored in the computer unit (2), in a para-axial arrangement of a transmitting optics (8), relative to the pivot axis (A) of the hinge articulation (6), for the calculation of a parallax-dependent separation of at least one laser distance measurement module (4a, 4b).

7. The lateral distance hand-held measurement device of claim 5, wherein the first laser distance measuring module (4a, 4b) is connected directly to the hinge articulation (6) that includes a measurable pivoting limb, wherein a mechanical and optional data interface (9) to a second laser distance measuring module (4a, 4b) is arranged on the measurable pivoting limb, said second laser distance measuring module (4a, 4b) being configured as a stand-alone for the purpose of distance measuring, fully functional laser distance measuring device.

8. The lateral distance hand-held measuring device of claim 6, wherein mechanical and optional data interfaces (9) to a laser distance measuring module (4a, 4b) are arranged on a limb of the hinge articulation (6), said a laser distance measuring module (4a, 4b) being configured as stand-alone for the purpose of distance measuring, fully functional laser distance measuring devices.

9. The lateral distance hand-held measuring device of claim 8, wherein the data interface (9) is includes one of electrical plug contacts and a wireless interface.

10. A hinge articulation for terminating in the lateral distance hand-held measuring device according to claim 8, characterized in that on each limb mechanical and optional data interfaces (9) are arranged for each laser distance measuring module (4a, 4b), which are configured as stand-alone for the purpose of distance measuring, fully function laser distance measuring devices.

11. The lateral distance hand-held measuring device of claim 4, wherein the angle measuring telescope (7) is an angle encoder.

12. The lateral distance hand-held measuring device of claim 4, the pivot angle ($\alpha$) of 180° is a mechanical stop of the hinge articulation (6).

* * * * *